3,171,853
S-BENZYLTHIOMETHYL NEUTRAL ESTERS OF THIOPHOSPHORUS PENTAVALENT ACIDS
Walter Lorenz, Wuppertal-Vohwinkel, and Gerhard Schrader, Wuppertal-Cronenberg, Germany, assignors to Farbenfabriken Bayer Aktiengesellschaft, Leverkusen, Germany, a corporation of Germany
No Drawing. Filed Oct. 27, 1959, Ser. No. 848,930
Claims priority, application Germany Nov. 7, 1958
9 Claims. (Cl. 260—461)

The present invention relates to and has as its objects new and useful insecticidal thiophosphoric acid ester derivatives of benzyl thiomethyl ethers and processes for their production. In these new compounds an ester radical linked with sulfur is a benzyl mercaptomethyl group. Under thiophosphoric acid esters as defined by this invention there are not only to be understood the derivatives of thiophosphoric acid itself but also benzyl mercaptomethyl esters of acids of phosphorus, the only prerequisite being that the aforesaid ester radical is bound to a phosphorus atom via a thiol sulfur. The esters are best illustrated by the following general formula.

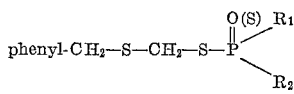

wherein phenyl may also stand for a possibly substituted phenyl radical, $R_1$ and $R_2$ stand for optional lower alkoxy, saturated or unsaturated alkyl or aryl groups which may be further substituted; $R_1$ and $R_2$ may also mean (in derivatives of thiophosphoric acid) amino groups which may be substituted.

Thus, as examples for phenyl there may be mentioned the phenyl group itself, the different chloro- and dichlorophenyls, the different tolyl and xylyl groups, the nitrophenyl groups, the nitrochlorophenly groups, the alkoxy-phenyl groups, alkylmercaptophenyl groups, and the like. The lower alkoxy groups designated as $R_1$ and $R_2$ above may contain optionally up to 6 carbon atoms. If $R_1$ and $R_2$ are hydrocarbons those hydrocarbon radicals also should contain optionally up to 6 carbon atoms, if saturated, and up to 10 carbon atoms, if unsaturated. If $R_1$ or $R_2$ are aryl groups they may be a phenyl group and their substitution products for example as defined above under the definition of the phenyl group. If one of $R_1$ and $R_2$ is an amino group (in the derivatives of thiophosphoric acid) this amino group as said above may be substituted so that it is a methyl amino, dimethyl amino, ethyl amino, diethyl amino, propyl amino, dipropyl amino group, piperidino, morpholino group and the like.

The production of the new compounds is carried out in a manner known in principle, i.e. by conversion of a benzyl-mercaptomethyl halide with salts of the corresponding thiolphosphoric acid compounds, phosphoric acid compounds being the aforesaid compounds. As benzyl-mercaptomethyl halide there is suitably used the chloride which may be produced in a simple manner from benzylmercaptan, paraformaldehyde and hydrochloric acid and which may be further reacted to give the corresponding thiophosphoric acid ester derivative even without isolation. In some cases it is, however, expedient to isolate the α-chloromethyl thioether of benzylmercaptan prior to further working-up to the desired thiophosphoric acid ester.

The new thiophosphoric acid compounds of the class according to the invention are used similarly to phosphoric acid esters already on the market for pest control or plant protection. The new compounds are applied in a manner known in principle, namely preferably in combination with suitable solid or liquid extenders or diluents. If solid extenders are concerned the preferred agents are talc, chalk, bentonite or the like, in the case of liquid diluents water is usually preferred, but in combination with suitable solubilizing agents and commercial emulsifiers.

As an example for the special utility of the inventive compounds the compounds of the following formulae

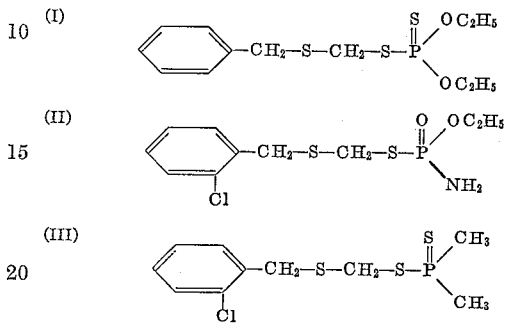

have been tested against spider mites and larvae of the type Aedes aegypti (with compound I) and against aphids and spider mites (with compounds II and III) respectively. Aqueous solutions of the aforesaid compounds have been prepared by admixing them with the same amount of an auxiliary solvent (acetone). A commercial emulsifier (benzyl hydroxy diphenyl polyglycol ether) is added in an amount of 20% referred to active ingredient. This premixture then is diluted with water to the desired concentration. The tests have been carried out as follows:

(a) Against spider mites (contact-insecticidal action): Bean plants (Phaseolus vulgaris) of about 15 inches height have been sprayed drip wet with solutions as prepared above in a concentration as shown below. The bean plants have been infested heavily with the two-spotted spider (species Tetranchyus telarius). Evaluation has been carried out after 24 hours, 48 hours and 8 days. The total percentage of killed pests after 8 days is to be seen from the following table:

| Compound | Aqueous concentration (in percent active ingredient/water) | Killing rate (in percent) |
|---|---|---|
| (I) | 0.1 | 100 |
| (II) | 0.1 | 100 |
| (III) | 0.001 | 100 |

(b) Against larvae of the type Aedes aegypti: About 20 larvae were brought into diluted aqueous emulsions prepared as described above. Counting of the dead pests occurred after 24 hours. The following results have been obtained:

| Compound | Aqueous concentration (in percent active ingredient/water) | Killing rate (in percent) |
|---|---|---|
| (I) | 0.00001 | 100 |

(c) Against aphids (species Doralis fabae): Heavily infested bean plants (Vicia faba) have been sprayed drip wet with solutions as prepared above in concentrations as shown below. The effect has been determined by evaluation after 24 hours by counting the dead pests either on the surface of the soil or still remaining on the plants. The following results have been obtained:

| Compound | Aqueous concentration (in percent active ingredient/water) | Killing rate (in percent) |
|---|---|---|
| (II) | 0.1 | 100 |
| (III) | 0.01 | 100 |

The following examples are given for purpose of illustrating the present invention:

*Example 1*

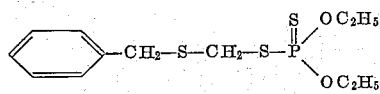

124 grams (1 mol) of benzyl mercaptan are suspended with 30 grams (1 mol) of paraformaldehyde and 80 cc. of methylene chloride. A stream of dry hydrogen chloride is passed through the mixture with stirring at 0° C. for 2 hours. The paraformaldehyde dissolves. The reaction product is then dried by the addition of 30 grams of calcium chloride followed by fractionation. 100 grams of the α-chloromethyl thioether of benzyl mercaptan are obtained in this manner. B.P. 94° C./2 mm. Hg.

40 grams of the product obtained are mixed with 38 grams (0.2 mol) of diethylthiophosphoric acid; 40 cc. of ethylene chloride are added to the mixture. The mixture is then heated to 90–100° C. for 15 minutes. Hydrogen chloride escapes. Fractionation of the crude product yields 28 grams of the new ester of B.P. 138–140° C./0.01 mm. Hg. Yield 34% of the theoretical. Mean toxicity on rats per os: 25 mg./kg. Grain weevils and spider mites are killed to 100% at 0.1% concentrations. Larvae of *Aedes aegypti* are also killed to 100% at 0.00001% concentrations.

By the same way as described above there are prepared the following compounds which showed also good insecticidal activities:

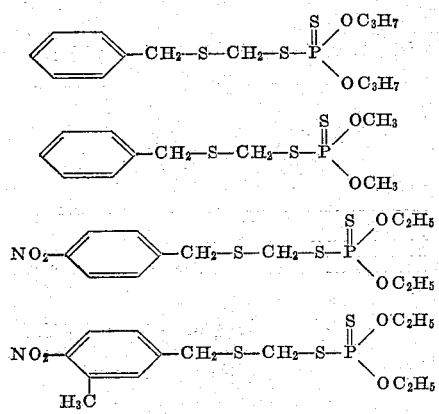

*Example 2*

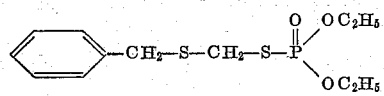

36 grams of the condensation product of benzyl chloride, paraformaldehyde and hydrogen chloride (B.P. 94° C./2 mm. Hg) are run with stirring at 50–60° C. into 38 grams (0.2 mol) of diethyl-thiolphosphoric acid ammonium salt in 120 cc. of methylethyl ketone. The mixture is heated to 60° C. for about another 20 minutes, then cooled down to room temperature and the ammonium chloride formed is filtered with suction. The filtrate is shaken three times with 40 cc. of water each time and then dried with sodium sulfate. Upon fractionation 44 grams of the new ester of B.P. 138° C./0.01 mm. Hg are obtained. Yield: 63% of the theoretical. Mean toxicity on rats per os: 5 mg./kg. Grain weevils are killed to 80% at 0.01% concentrations. Aphids are killed to 100% at 0.001% concentrations. Gnat larvae (of *Aedes aegypti*) are killed to 100% at 0.0001% concentrations.

By the same way as described above there are prepared the following compounds which showed also good insecticidal activities:

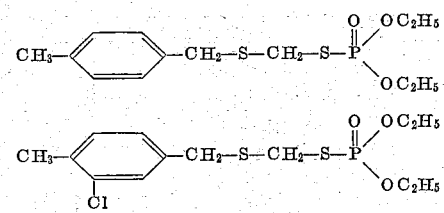

*Example 3*

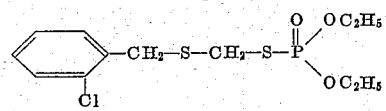

To a solution of 60 grams (0.32 mol) of diethylthiolphosphoric acid ammonium salt in 150 cc. of n-propyl alcohol there are added dropwise 41.4 grams (0.2 mol) of 2-chlorobenzyl mercaptomethyl chloride. The temperature slowly rises to 35° C. with separation of ammonium chloride. To complete the reaction the mixture is warmed to 60–70° C. for an hour. After cooling water is added and the oil taken up in benzene. The product is washed with water, if desired, with a little sodium bicarbonate solution and the solvent is dried with sodium sulfate. After distillation of the solvent an oil is obtained distilling after slight first runnings at 135° C./0.01 mm. Hg as a pale yellow oil. Yield: 60 grams corresponding to 88.3% of the theoretical. Aphids and spider mites are killed completely with 0.001% solutions. Caterpillars are killed completely with 0.1% solutions. Larvae of the type *Aedes aegypti* are killed to 100% with 0.00001% concentrations.

*Example 4*

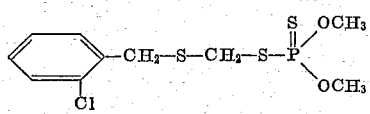

To 63 grams (0.35 mol) of dimethyl dithiophosphoric acid ammonium salt in 200 cc. of n-propyl alcohol there are added dropwise 55.5 grams (0.27 mol) of 2-chlorobenzyl mercaptomethyl chloride. The mixture is stirred for half an hour at 50° C. and then worked up as described in Example 3. A nearly colorless oil boiling at 130° C./0.01 mm. Hg is obtained. Yield: 88 grams corresponding to 95.4% of the theoretical. $LD_{95}$ on rats per os: 50 mg./kg. Aphids are killed to 90% at 0.001% concentrations and spider mites to 100%. Systemic action kills aphids to 100% at 0.1% concentrations.

*Example 5*

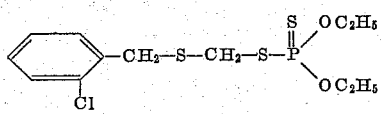

55.5 grams (0.25 mol) of 2-chlorobenzyl mercaptomethyl chloride are added dropwise, starting from 20° C. to a solution of 73 grams (0.36 mol) of diethyl dithiophosphoric acid ammonium salt in 200 cc. of n-propyl alcohol. The temperature slowly rises to 38° C. After stirring for half an hour at 50° C. the reaction product is poured into water. The precipitated oil is taken up with benzene, washed and dried. After distilling off the solvent a colorless water-insoluble oil of a B.P. of 127° C./0.01 mm. Hg is obtained. Mean toxicity on rats per os: 10 mg./kg. Yield: 89 grams corresponding to 89% of the theoretical.

Aphids are killed to 100% at 0.001% concentrations and spider mites to 90%. Ovicidal action on the eggs of the red spider.

*Example 6*

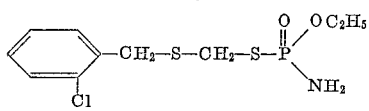

52 grams (0.319 mol) of the sodium salt of aminoethyl thiolphosphoric acid and 51 grams (0.246 mol) of 2-chlorobenzyl mercaptomethyl chloride are stirred in 200 cc. of acetonitril for an hour at room temperature. The reaction takes place with a slight heat effect and is completed by heating to 50° C. for an hour. After cooling it is taken up with benzene, washed and dried with sodium sulfate. After distilling off the solvent an oil is obtained which rapidly crystallizes. Recrystallized from ethyl acetate there are obtained colorless needles of M.P. 88° C. Yield: 45 grams corresponding to 58.4% of the theoretical.

Caterpillars, aphids and spider mites are killed to 100% with 0.1% concentrations. Systemic action on spider mites 100% with 0.1% concentrations.

By the same way as described above there are prepared the following compounds which showed also good insecticidal activities:

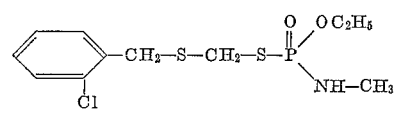

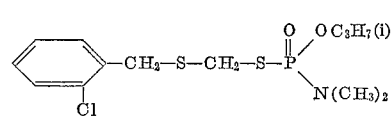

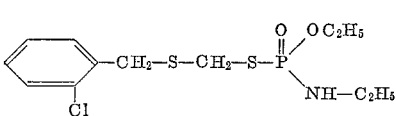

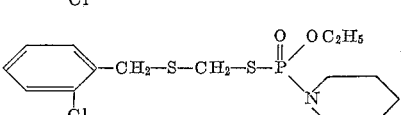

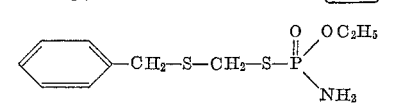

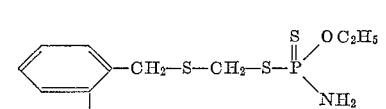

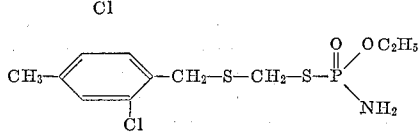

*Example 7*

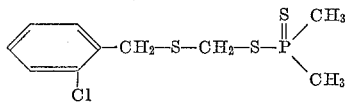

To a solution of 50 grams (0.3 mol) of dimethyl dithiophosphinic acid potassium salt in 150 cc. of n-propyl alcohol there are added dropwise, starting from 20° C., 52 grams (0.25 mol) of 2-chlorobenzyl mercaptomethyl chloride. The reaction proceeds with slow heating to 46° C. and precipitation of potassium chloride. The mixture is stirred for half an hour at room temperature and the reaction product is poured into water. The oil is taken up with benzene and worked up in the manner previously described. The ester obtained boils after slight first runnings at a B.P. of 137° C./0.01 mm. Hg as a highly viscous pale yellow oil. Yield: 72 grams corresponding to 96.8% of the theoretical.

Aphids are killed completely with 0.01% solutions. 0.001% solutions kill spider mites to 100%. Caterpillars are killed to 100% with 0.1% concentrations.

By the same way as described above there are prepared the following compounds which showed also good insecticidal activities:

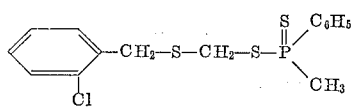

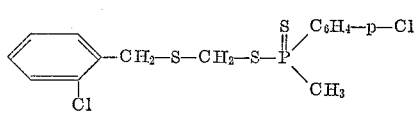

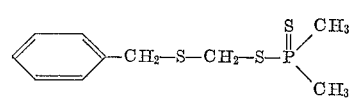

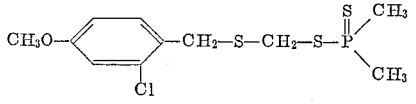

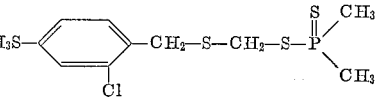

*Example 8*

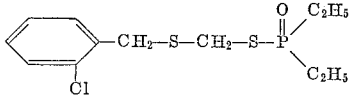

52 grams (0.25 mol) of 2-chlorobenzyl mercaptomethyl chloride are added dropwise to a suspension of 47 grams (0.3 mol) of diethylthiolphosphinic acid potassium salt in 150 cc. of n-propyl alcohol. After stirring at room temperature for half an hour the mixture is heated to 50° C. for a further half an hour and then worked up as previously described. Upon distillation a viscous somewhat yellow oil of a B.P. of 137° C./0.01 mm. Hg is obtained. Yield: 75 grams corresponding to 97.5% of the theoretical.

Aphids and spider mites are killed completely with 0.01% concentrations.

By the same way as described above there are prepared the following compounds which also showed good insecticidal activities:

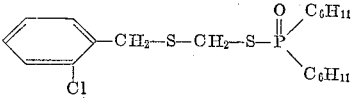

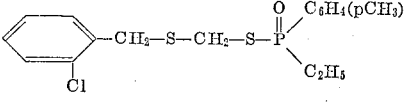

*Example 9*

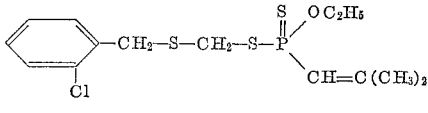

To a solution of 52 grams (0.25 mol) of the S-ammonium salt of (β,β-dimethyl-vinyl)-O-ethyl-thionophosphonic acid in 100 cc. of n-propyl alcohol there are added dropwise 32 grams (0.16 mol) of 2-chlorobenzyl mercaptomethyl chloride. The reaction proceeds rapidly with separation of ammonium chloride, the temperature rising to 43° C. After stirring for another half hour at 50° C. water is added. The oil is taken up with benzene and washed with sodium bicarbonate solution and finally with water. After distilling off the solvent a pale yellow oil is obtained which cannot be distilled. Yield: 50 grams corresponding to 85.2% of the theoretical.

Aphids are killed completely with 0.01% solutions. Spider mites are killed completely with 0.001% solutions. Caterpillars are killed to 100% with 0.1% concentrations. Ovicidal action on the eggs of the red spider.

By the same way as described above there are prepared the following compounds which also showed good insecticidal activities:

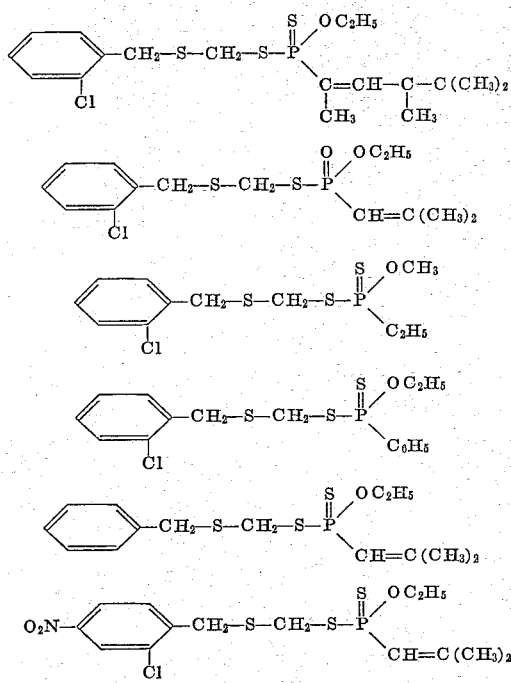

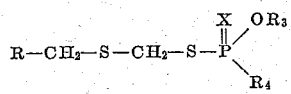

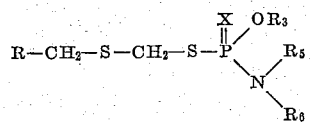

We claim:
1. A compound of the following general formula

$$R-CH_2-S-CH_2-S-P\overset{\overset{X}{\|}}{\underset{R_4}{\diagup}}OR_3$$

in which R stands for a chlorophenyl radical, $R_3$ stands for a lower alkyl radical up to 4 carbon atoms, $R_4$ stands for lower alkenyl radicals having up to 8 carbon atoms and X stands for a member selected from the group consisting of oxygen and sulfur.

2. A compound of the following general formula $$R-CH_2-S-CH_2-S-P\overset{\overset{X}{\|}}{\diagup}\underset{\underset{R_6}{N}}{OR_3}\diagup R_5$$

in which R stands for a chlorophenyl radical, $R_3$ stands for a lower alkyl radical up to 4 carbon atoms, $R_5$ and $R_6$ stand for hydrogen, and X stands for a member selected from the group consisting of oxygen and sulfur.

3. A compound of the following general formula

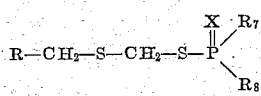

in which R stands for a phenyl radical, $R_7$ and $R_8$ stand for a member selected from the group consisting of lower alkyl radicals having up to 6 carbon atoms, lower alkenyl radicals having up to 8 carbon atoms and phenyl radicals, and X stands for a member selected from the group consisting of oxygen and sulfur.

4. The compound of the following formula

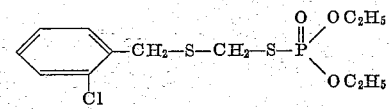

5. The compound of the following formula

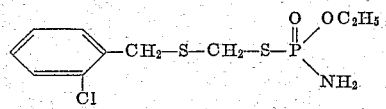

6. The compound of the following formula

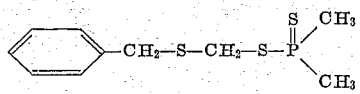

7. The compound of the following formula

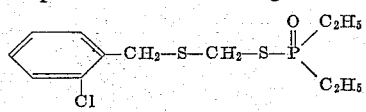

8. The compound of the following formula

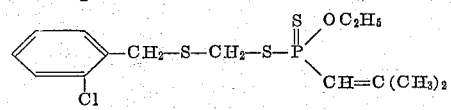

9. A compound of the following formula

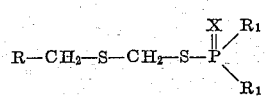

in which R stands for a phenyl radical; $R_1$ stands for a member selected from the group consisting of lower alkyl radicals having up to 6 carbon atoms, lower alkenyl radicals having up to 8 carbon atoms and phenyl radicals; $R_2$ stands for a member selected from the group consisting of lower alkyl radicals having up to 6 carbon atoms, lower alkenyl radicals having up to 8 carbon atoms, amino, lower alkyl amino and lower dialkyl amino; and X stands for a member selected from the group consisting of oxygen and sulfur.

References Cited in the file of this patent
UNITED STATES PATENTS

| | | |
|---|---|---|
| 2,571,989 | Schrader | Oct. 16, 1951 |
| 2,586,655 | Hook et al. | Feb. 19, 1952 |
| 2,614,988 | Hook et al. | Oct. 21, 1952 |
| 2,862,019 | Schrader | Nov. 28, 1958 |
| 2,881,201 | Schrader | Apr. 7, 1959 |
| 2,895,982 | Stiles | July 21, 1959 |
| 2,923,730 | Schrader | Feb. 2, 1960 |
| 2,963,505 | Muhlmann et al. | Dec. 6, 1960 |

FOREIGN PATENTS

| | | |
|---|---|---|
| 1,032,247 | Germany | June 19, 1958 |